(12) United States Patent
Puniello et al.

(10) Patent No.: US 7,655,171 B2
(45) Date of Patent: Feb. 2, 2010

(54) GOLF BALL MIXING AND DISPENSING PROCESS

(75) Inventors: Paul A. Puniello, Bristol, RI (US); Shawn Ricci, New Bedford, MA (US); Peter L. Serdahl, New Bedford, MA (US); Timothy S. Correia, New Bedford, MA (US); John T. Davies, Blackstone, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 12/366,982

(22) Filed: Feb. 6, 2009

(65) Prior Publication Data

US 2009/0140463 A1    Jun. 4, 2009

Related U.S. Application Data

(60) Division of application No. 11/178,621, filed on Jul. 11, 2005, now Pat. No. 7,490,975, which is a continuation-in-part of application No. 10/862,834, filed on Jun. 7, 2004, now Pat. No. 7,246,937.

(51) Int. Cl.
B29C 45/00 (2006.01)
(52) U.S. Cl. .................. 264/328.11; 254/328.15; 254/328.8; 425/549; 425/574
(58) Field of Classification Search .......... 264/328.6, 264/328.8, 328.11, 328.5; 425/549, 574
See application file for complete search history.

(56) References Cited

U.S. PATENT DOCUMENTS

| | | | |
|---|---|---|---|
| 2,951,261 A * | 9/1960 | Sherman ............... 425/425 |
| 3,051,455 A | 8/1962 | Magester | |
| 4,022,438 A | 5/1977 | Shishido | |
| 4,035,467 A * | 7/1977 | Campbell et al. ....... 264/328.6 |
| 4,165,187 A * | 8/1979 | James ................... 425/159 |
| 4,350,803 A * | 9/1982 | Penn ..................... 528/10 |
| 4,460,278 A | 7/1984 | Matsubara et al. | |
| 4,635,432 A * | 1/1987 | Wheeler ................. 57/221 |
| 4,642,320 A * | 2/1987 | Turner et al. ............ 521/176 |
| 4,721,391 A * | 1/1988 | Bauer ................... 366/162.5 |
| 4,953,633 A * | 9/1990 | Hermans ................ 165/109.1 |
| 5,046,548 A * | 9/1991 | Tilly .................... 165/140 |
| 5,171,557 A | 12/1992 | Crosbie et al. | |
| 5,407,341 A * | 4/1995 | Endo et al. ............... 425/116 |
| 5,464,585 A * | 11/1995 | Fitzgibbon ............... 264/108 |
| 5,482,665 A * | 1/1996 | Gill ...................... 264/113 |
| 5,733,428 A * | 3/1998 | Calabria et al. .......... 264/134 |
| 5,824,258 A * | 10/1998 | Yamaguchi .............. 264/328.1 |
| 5,874,038 A * | 2/1999 | Kasashima et al. ....... 264/279 |
| 6,024,551 A * | 2/2000 | Yamaguchi .............. 425/116 |
| 6,063,319 A * | 5/2000 | Dalton et al. ............ 264/275 |
| 6,093,360 A * | 7/2000 | Inoue et al. ............. 264/278 |

(Continued)

Primary Examiner—Joseph S Del Sole
Assistant Examiner—David N Brown, II
(74) Attorney, Agent, or Firm—Daniel W. Sullivan

(57) ABSTRACT

The present invention provides an improved process for mixing castable polyurethanes and polyureas and for prolonging the dispensing time for dispensing them into a golf ball mold for application to a golf ball sub-assembly. A nozzle framework includes support housing heaters and heater adaptors for each dispensing port to delay the onset of drool and improve cut off in the dispensing tubes. The combination of fluorinated dispensing ports, the heating of the polyureas or polyurethanes, and inclusion of a capillary orifice in each dispensing port significantly prolongs the time before the advent of drool is detected.

10 Claims, 8 Drawing Sheets

U.S. PATENT DOCUMENTS

| | | | |
|---|---|---|---|
| 6,221,208 B1* | 4/2001 | Damberg | 162/52 |
| 6,235,961 B1* | 5/2001 | Kurukchi | 585/854 |
| 6,319,451 B1* | 11/2001 | Brune | 264/278 |
| 6,413,464 B1* | 7/2002 | Tanaka | 264/328.2 |
| 7,246,937 B2 | 7/2007 | Verronneau et al. | |
| 2002/0173385 A1* | 11/2002 | Shannon et al. | 473/378 |
| 2002/0191481 A1* | 12/2002 | Cox et al. | 366/16 |
| 2005/0269746 A1* | 12/2005 | Puniello et al. | 264/328.14 |
| 2005/0270898 A1* | 12/2005 | Verronneau et al. | 366/149 |
| 2006/0189780 A1* | 8/2006 | Haas et al. | 528/44 |
| 2007/0035063 A1* | 2/2007 | Lavallee et al. | 264/255 |
| 2009/0140463 A1* | 6/2009 | Puniello et al. | 264/331.19 |

* cited by examiner

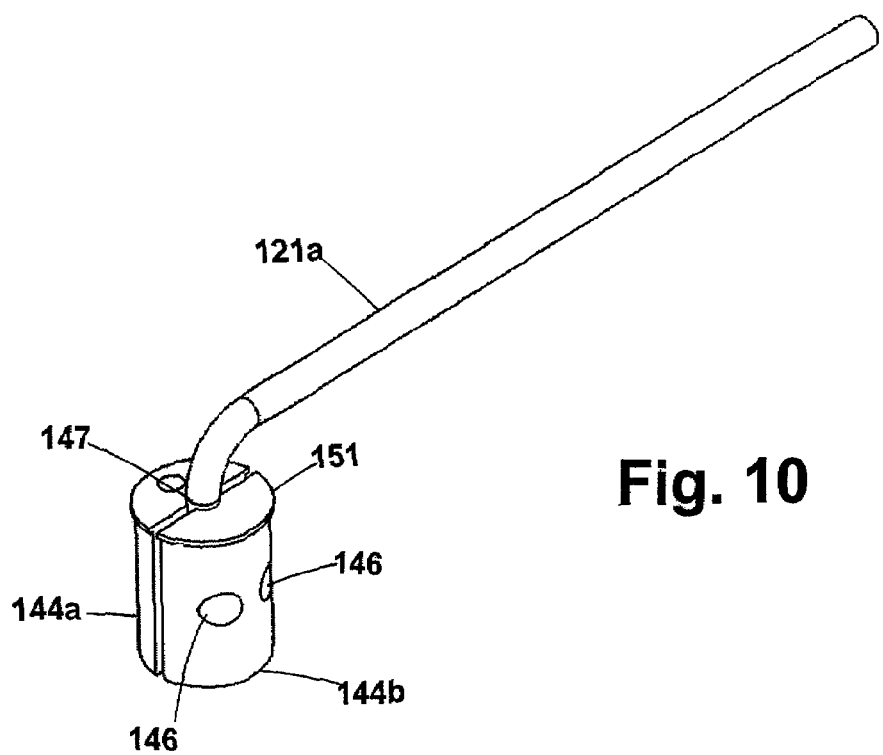
Fig. 10
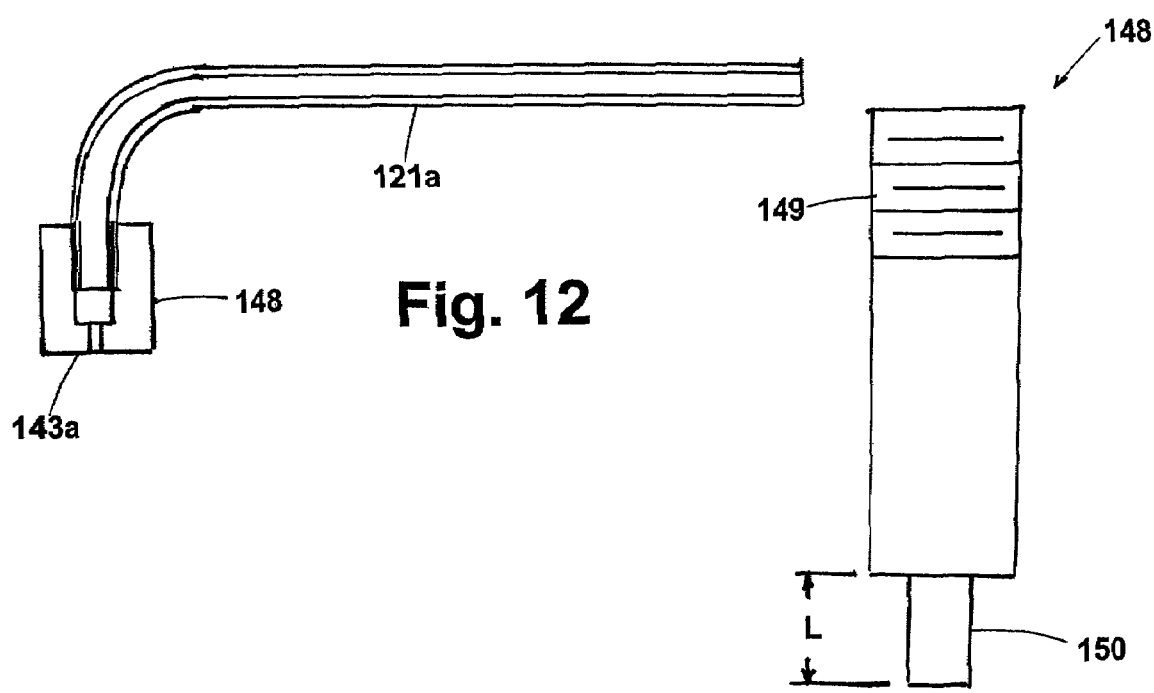
Fig. 12
Fig. 11

GOLF BALL MIXING AND DISPENSING PROCESS

CROSS-REFERENCE TO RELATED APPLICATIONS

This application is a divisional of U.S. patent application Ser. No. 11/178,621 having a filing date of Jul. 11, 2005 now U.S. Pat. No. 7,490,975, now allowed, which is a continuation-in-part of U.S. patent application Ser. No. 10/862,834 having a filing date of Jun. 7, 2004, now issued as U.S. Pat. No. 7,246,937, the entire contents of which are hereby incorporated by reference.

FIELD OF THE INVENTION

This invention relates generally to a process for mixing of castable polyurethanes and polyureas, and, more particularly, to an improved process for temperature control and prolonged dispensing of the mixture with improved cutoff of material flow.

BACKGROUND OF THE INVENTION

In castable flow molding processes employing a plurality of castable polyurethane components, the homogeneity and the quality of the molded material is mainly determined by the mixing operation which immediately precedes the molding.

For example, after an amount of time in which the reactants come into contact, a polymerization reaction process begins producing the moldable material. Many times, striae form within the moldable material that is visible. The striae are a result of poor mixing which inhibits the quality of the material. Therefore, it is desirable to produce a mixture which is as homogeneous as possible, in the shortest possible time, in order to bring about a uniform reaction to avoid the formation of striae. However, there is an additional difficulty presented in mixing reactive components in the case of polyurethane, in that the two components, i.e., polyol and the isocyanate, have substantially different viscosities.

The use of known mixing processes does not lead to the desired result for producing a high quality polyurethane material. For example, with some processes that employ static mixers that make use of various known mixers for mixing liquids in the laminar flow regime, it is found that a relatively long mixing length is needed to produce sufficient mixing. Often, the mixture requires a relatively long time to pass through this long mixing length, meanwhile, the polymerization process has already begun. Due to the quick setting characteristics of polyurethane, the material will gel or "set up" within the mixer instead of being discharged into the usual succession of molds. The molds are generally moved past the discharge of the mixer in time relation to the discharge. If, for any reason, a slight delay or decrease in the flow rate of the mixture through the mixer occurs, the mixture gels in portions of the mixer and restricts flow, thus further slowing the discharge and resulting in the entire mixer being clogged with hard setting components. An improvement in slowing down the gel time is necessary to allow the mixture to progress through the system.

Generally, static mixers are in the form of a tubular chamber, with a rigid static mixing device disposed therein. Because of the very nature of the static mixer, the mixer cannot be cleaned readily once any appreciable quantity of material has gelled in the various mixing elements which form the static mixing device. Attempts have been made to clean the static mixer, but due to the cementing and interlocking effects of the material this approach has proven impractical. Therefore, available static mixers perform poorly in practice because the mixer may only be used, in some instances, for 15 to 30 minutes before "plugging-up".

In place of the static mixer, a dynamic mixer may be employed with the aim of reducing the mixing time. While the results generally improve the quality of mixing, the temperature of the reaction mixture may be increased by frictional and shear heating, and local fractions of the mixture which can be generated in an advanced state of polymerization must be eliminated. Consequently, when dynamic mixers are used, significant improvements must be made towards controlling the exothermic temperatures. Additionally, caution must be taken to insure that the dynamic mixer does not introduce pockets of gas in the form of air bubbles into the moldable material, which may lead to poor quality. Moreover, dynamic mixers may require frequent flushing with solvents resulting in a sludge material which has to be disposed of.

In dispensing of a polyurea material a particular problem has been seen in maintaining or prolonging the dispensing time. A major problem exists in the accumulation of cured material in the dispensing tubes wherein the dispensing time is greatly reduced.

The present invention is directed to overcoming one or more of the problems as set forth above, particularly towards prolonging the dispensing time.

SUMMARY OF THE INVENTION

The present invention is directed to a process for mixing and dispensing of urethane and urea components for application upon a golf ball sub-assembly. The apparatus comprises a rear mixing block for receiving at least two components, a system for pumping the urethane components through the mixing block, a mixer body having a middle portion that defines a bore extending axially along its longitudinal axis with a plastic disposable dynamic mixer element disposed in the bore for mixing the components, a temperature control chamber encompassing the mixer body for controlling heat generated by the exothermic reaction that is created when the urethane components combine and mix, and a nozzle assembly for dispensing the mixed urethane and urea components into a mold cavity containing the golf ball sub-assembly.

Employed in the present invention is a dynamic mixer element having a structure of multiple segments at a 90° relationship to each to create a tortuous and effective mixing path.

Another embodiment of the apparatus has for a temperature control chamber, a mixing housing encompassed by a cooling jacket. The mixing housing has a middle portion defining a bore extending axially therein with means disposed in the bore for mixing the components. The mixing housing has a helical groove extending generally about its outer perimeter and along the longitudinal length of the housing, and having a water inlet and a water outlet for permitting the cooling water to circulate about the housing. The cooling jacket surrounds the mixing housing in a relatively tight sealing relationship to the housing, and provides a means for controlling the heat generated by the exothermic reaction of the urethane components combining and mixing.

The present invention provides for a process to mix urethane reactive components into homogenous material. The process comprises pumping bulk materials through the apparatus wherein they are mixed by a plastic disposable mixer element, while the temperature of the mixing components (which emit a relatively large amount of heat due to their exothermic reaction), is controlled. The mixed urethane composition is dispensed into a golf ball mold cavity for forming around a golf ball sub-assembly.

The apparatus is completed by a nozzle assembly which utilizes pneumatic pressure to dispense via dispensing ports the mixed urethane components into mold cavities containing golf ball sub-assemblies. The nozzle assembly employs cartridge heaters and heating adaptors to heat the components such that drool is delayed or eliminated in the dispensing ports such that the dispensing time can be increased up to 5 hours.

BRIEF DESCRIPTION OF THE DRAWINGS

For a better understanding of the present invention, reference may be made to the accompanying drawings in which:

FIG. 1a is cutout segmented view of the mixer element;
FIG. 10 is a perspective view of a dispensing port with a heating adaptor;
FIG. 11 is a capillary orifice;
FIG. 12 is a cross section of a capillary orifice connected to a dispensing port.

DETAILED DESCRIPTION OF THE INVENTION

Figure 1:
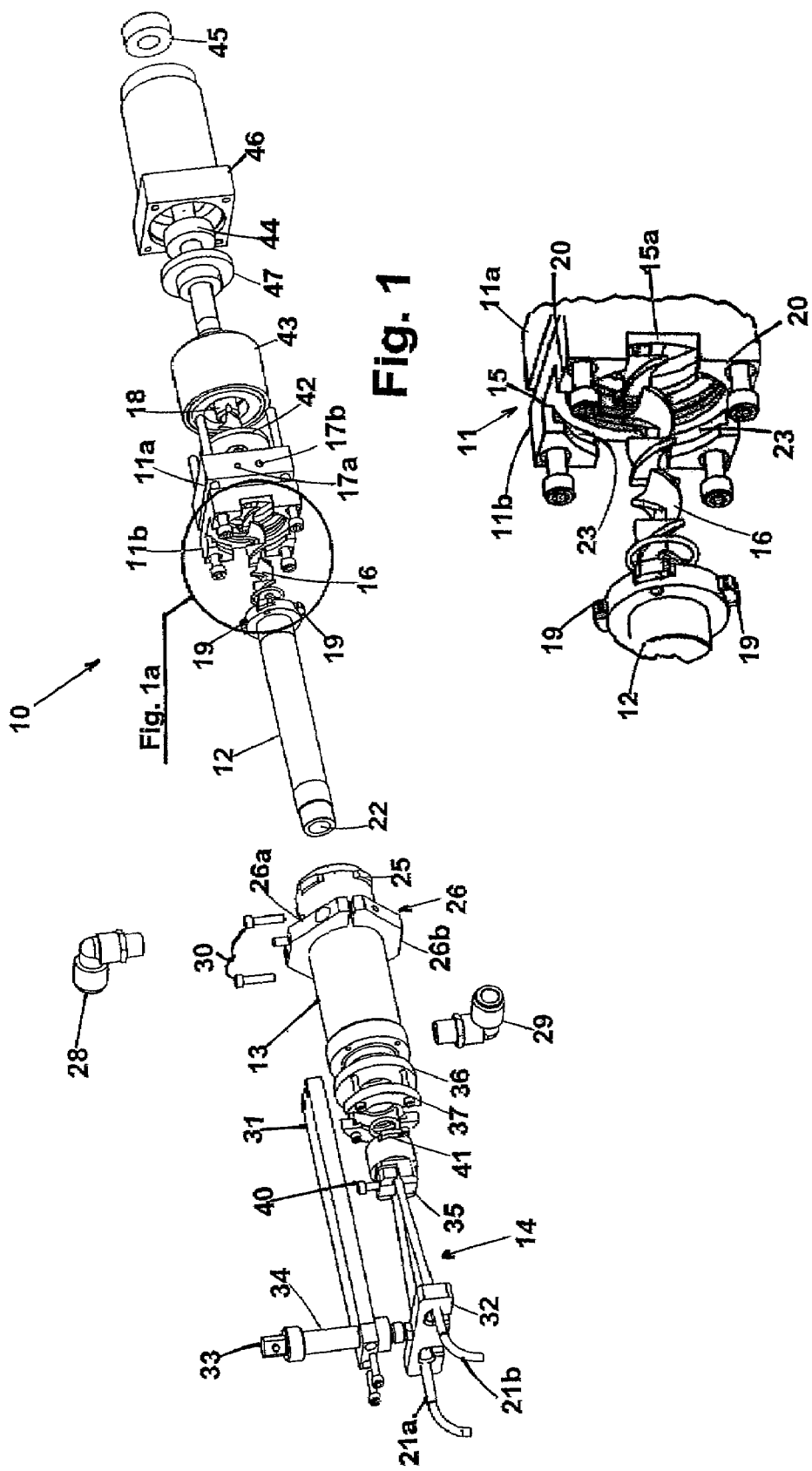
FIG. 1 is an expanded view of the apparatus.
Figure 2:
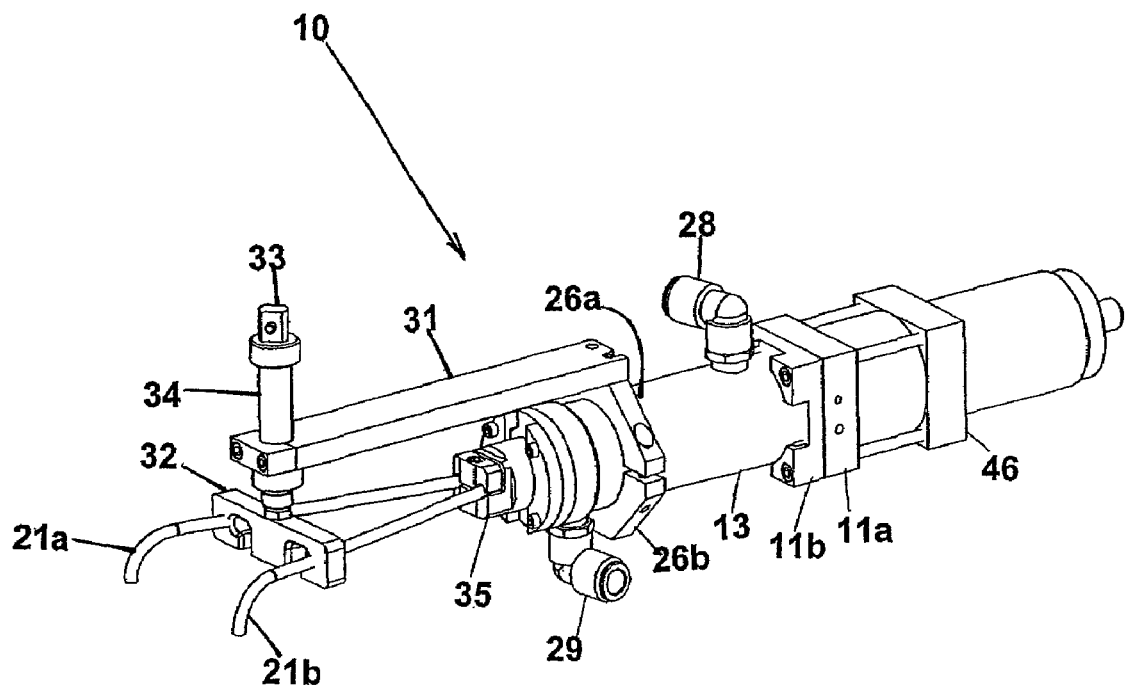
FIG. 2 is a perspective view of the completed apparatus of FIG. 1.
Figure 3:
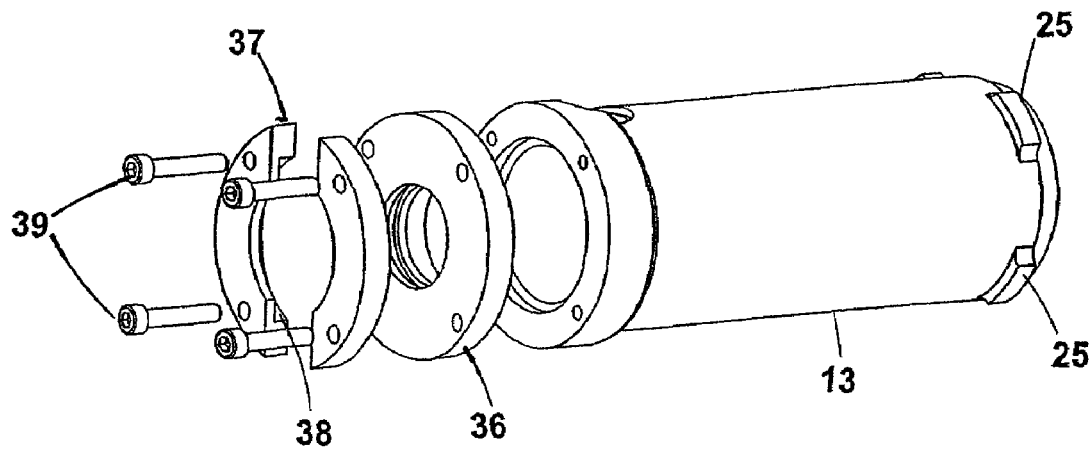
FIG. 3 a perspective view of the temperature control chamber of the invention.

Referring to FIGS. 1 to 3, an apparatus 10 of a hybrid urethane mixing system for producing a homogenous material from a mixture of a plurality of reactive components is shown. The apparatus 10 is comprised of four main portions: a mixing portion comprising of a mixer housing 11, having a rear mixing block 11a, and a front mixing block 11b, and a mixer body 12; a temperature control chamber 13 encompassing the mixer body 12; and, a nozzle assembly 14. The apparatus 10 utilizes a disposable plastic mixer element 16 (rotor). The apparatus 10 is designed to yield a more consistent product and enhanced temperature control for a urethane molding process for golf balls.

Advantageously, the present invention is directed to producing a flow moldable material from at least two castable urethane materials, such as urethanes, polyureas, and blends thereof. The materials need to be mixed, temperature controlled, and dispensed. In an embodiment of the invention, pumps (not shown) are provided to pump materials in premeasured amounts into the apparatus through openings 17a and 17b, in the rear mixing block 11a wherein they have an initial mixing. The materials are then pumped through to the mixer body 12 which contains the disposable plastic mixer element (rotor) 16 that is rotated by attachment to a slotted drive shaft 18. It is in the mixer body 12 where the primary mixing takes place.

The front mixing block 11b has an internal groove 15 having four apertures 15a for quick disconnect to the mixer body 12. At the rear end of the mixer body 12 are four raised ridges 19 which when inserted into the internal groove 15 through the apertures 15a the connection is completed by merely rotating the mixer body 12, within the internal groove 15. The front mixing block 11b also has four corner sections 20 that inherently define a large opening for receiving the temperature control chamber 13 which has four raised lip sections 25 disposed about its outer perimeter for easy insertion into four internal slots 23 defined in the four corner sections 20 for a quick disconnect fitting therein. A drive shaft 18 has a leading end slotted to allow a relatively easy friction fit coupling to the disposable mixer element 16, which is dimensioned to fit within the slot of the drive shaft 18 without the use of tools. The dynamic mixer element 16 includes left and right hand helical elements that aggressively mix the material as the material is pumped through the mixer body 12. The mixer body 12 is surrounded by an outer sleeve which forms the temperature control chamber 13. Controlling the temperature is extremely necessary in order to control the heat generated by the exothermic reaction from the urethane components combining and mixing. For a cooling medium, water is introduced to the temperature control chamber 13 by a water inlet 28 in near proximity to the front mixing block 11b and is removed via a water outlet 29 near the other end of the temperature control chamber 13. The water temperature control chamber 13 provides uniform process temperatures in the mixer body 12 which minimize "plating out" (build-up of cured material) on the dynamic mixer element 16. With reduced plate-out, the rotor cycle time is increased and apparatus downtime is reduced.

A bracket assembly 26 consisting of an upper section 26a and a lower section 26b is clamped about the temperature control chamber 13 at the end nearer to a nozzle assembly 14, and is coupled together by simple hex screws. This bracket assembly 26 forms a base that is connected to one end of an extended arm portion 31 of the nozzle assembly 14. After the material passes through the mixer body 12, it is then forced out of the nozzle assembly 14 through at least one dispensing port. For clarity two dispensing ports 21a and 21b are shown and described, wherein material is dispensed into a ball mold cavity to be applied about a golf ball sub-assembly (not shown). The dispensing ports 21a and 21b are seated in a fixture 32 which is connected to the other end of the extended arm portion 31. The ports 21a and 21b are caused to move vertically into and out of the ball mold cavities by pneumatic pressure. This pressure propels a piston rod 33, housed within a tube 34, to move down into the golf ball mold cavity and gradually be raised out of the cavity as the castable polyurethane or urea material is deposited in the mold cavity. The temperature control chamber 13 has at one end, near to the nozzle assembly 14, an insulating member 36 which is sandwiched between the temperature control chamber 13 and a relatively circle mounting member 37. The mounting member 37 has a slotted recess 38 defined therein, and the insulating member 36 and mounting member 37 are coupled to the chamber 13 by hex screws 39. The nozzle assembly 14 includes a dispensing tube housing 35 that holds the plastic tubing making up the dispensing tubes 21a and 21b. This is done by means of a simple hex screw 40. The dispensing tube housing 35 includes a pair of ears 41 which are inserted into the slotted recess 38 of the mounting member 37 by a simple quick disconnect motion by the operator which requires only a manual rotation of the ears 41 within the slotted recess 38.

The design of the mixing system minimizes exposure to urethane and urea raw materials by utilizing tool-free, quick-change components. The turn-to-lock connections and the slotted rotor drive shaft 18 are design features that make the operator's mixer maintenance tasks quicker and more efficient. The development of the quick-change mixer assembly provides for a reduction in the downtime necessary to service the apparatus 10 which requires frequent changing of the disposable mixer element 16 and even more frequent changing of the plastic tubing making up the dispensing ports 21a and 21b of the nozzle assembly 14. The reduction in the mixer block mass allows for enhanced water temperature control along the entire length of the mixer rotor 16 resulting in better mixer performance and increased mixer life. Utilizing a disposable dynamic mixer element 16 eliminates the need for relatively expensive machined mixing rotors, which can require significant cleaning and maintenance. When cleaning non-disposable rotors, workers are often exposed to cleaning chemicals and sensitive urethane materials. The present invention, in using the disposable dynamic mixer element 16, requires only that the mixer element 16 be periodically removed and discarded, and this generally eliminates any undesirable chemical exposure to workers. Frequent cleaning and repeated use of a permanent mixing rotor can often change the rotor mixing characteristics resulting in process variations due to rotor wear. The disposable dynamic mixer element 16 may be removed and replaced without the use of tools. This tool-free feature is very critical to the system, for in addition to the great reduction in downtime, it also eliminates the contamination of tools when such tools are required to service the mixer.

As shown in FIGS. 1 and 1a, the disposable plastic mixer element 16 generally is longer, smaller in diameter, and is less massive than non-disposable rotors. These features help to achieve improved temperature control. The mixer element 16 is disposed within a bore 22 that extends axially along the middle portion of the mixer body 12. The mixer element 16 is constructed of a predetermined number of segments which have right and left-hand helical twists, and extend axially along the bore 22. The segments are alternated and oriented such that one segment lies at 90° with respect to an adjacent segment. For example, one segment has an opposite helical twist and is shifted by a (radial) angle of 90° with respect to a preceding segment. Moreover, the mixer body 12 and the mixing segments define a tortuous mixing path which insure that the components are aggressively mixed The number of mixing segments comprising the dynamic mixer element 16 is dependent on the length of the bore 22. The extra length of the mixer element 16 provides increased surface area for better mixing, but also provides for greater surface contact for the cooling water flow. The relatively small diameter of the mixer element 16 and mixer body 12 improve forward material flow through the mixer (first in/first out). The temperature control of the mixing components results in an improved cure rate (gel) control, and produces improved material processing properties such as smooth flow and excellent shot cut-off. The gel rate time of the material flowing through the present invention is controlled such that the gel time will be at least 60 seconds, and preferably at least 70 seconds. The temperature of the urethane material is maintained at less than 180° F., preferably at less than 150° F. The dynamic mixer element 16 is available from ConProTec, Inc. of Salem, N.H. under the trade name "STRATOMIX"®.

The apparatus 10 is completed by a three hole packing gland 42 inserted into the back of the rear mixing block 11a and a lubricating chamber 43 and bearings 44 and 45 disposed within a bearing housing 46 support of the drive shaft 18. The bearing hosing having a two-hole packing gland 47 insulating it from the lubricating chamber 43. The apparatus 10 is made of parts that are generally stainless steel but it is appreciated that many various metals may be employed without affecting the structural integrity of the apparatus.

Figure 4:
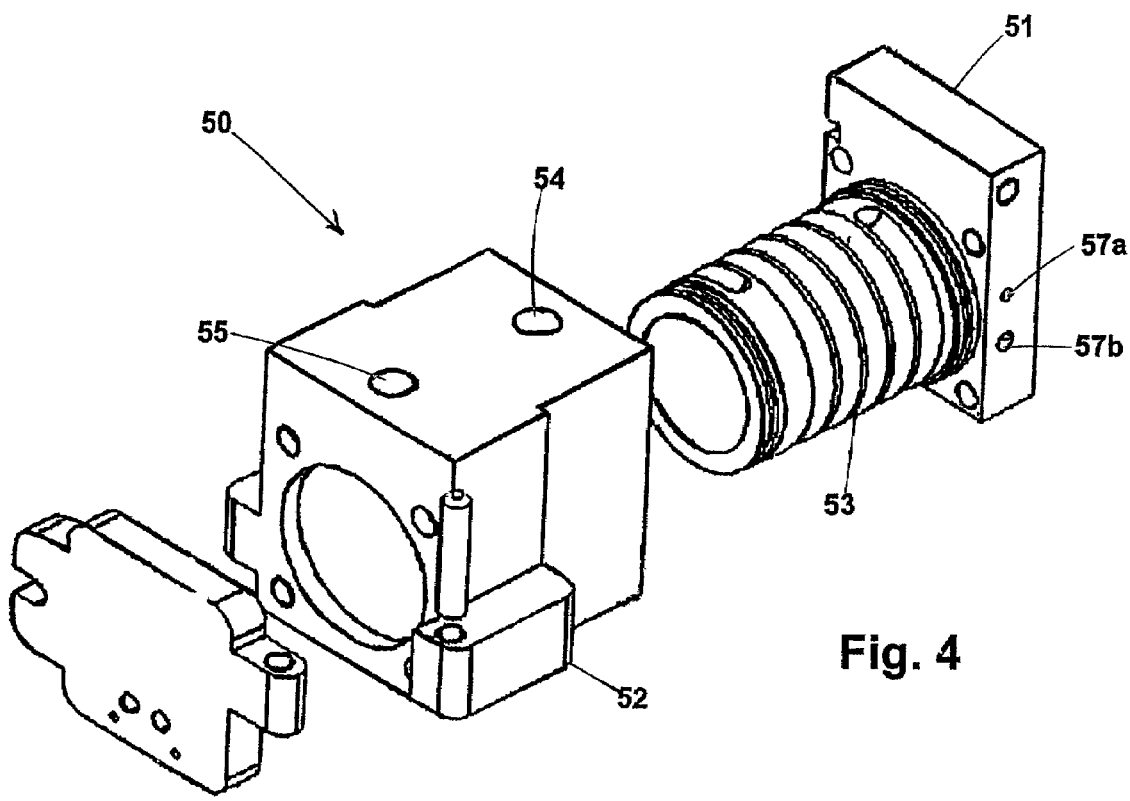
FIG. 4 is a perspective view of an embodiment of a temperature control chamber having a cooled mixer comprising a helical cooling channel.
Figure 5:
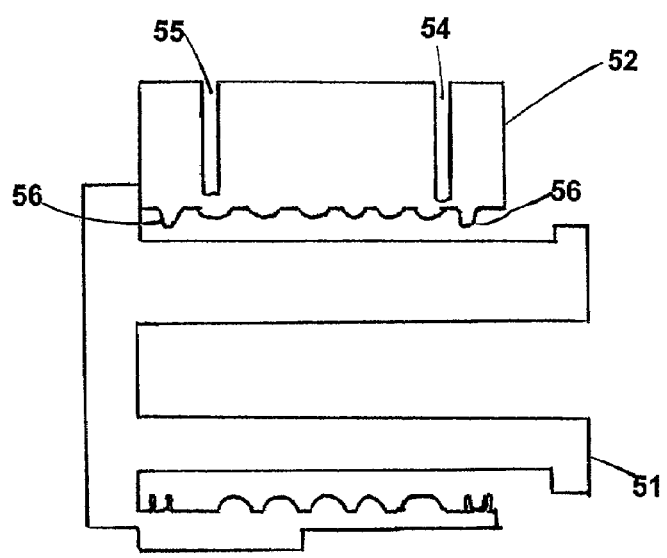
FIG. 5 is a cross section view of the cooled mixer of FIG. 4.

FIGS. 4 and 5 disclose another embodiment of a temperature control chamber. This embodiment includes a cooled mixer chamber 50 comprising a mixing housing 51 encased in a cooling jacket 52. A helical cooling channel 53 is spirally disposed about the mixing housing 51, with the mixing housing 51 having a helical groove contour that extends around the length of its outer perimeter and provides a track for placement of the helical cooling channel 53. The cooling jacket 52 has O-ring seals 56 disposed at each end to create a water tight seal between the jacket 52 and mixing housing 51. The helical cooling channel 53 has an inlet opening 54 for introducing cooling water and an outlet opening 55 for removal of the heated water after it has passed through the cooling channel 53. This provides positive and very efficient coolant flow over the length of the mixing housing 51. This embodiment is especially beneficial for use with castable polyurethanes and urea components which are introduced into the mixing housing through receiving ports 57a and 57b.

Figure 6:
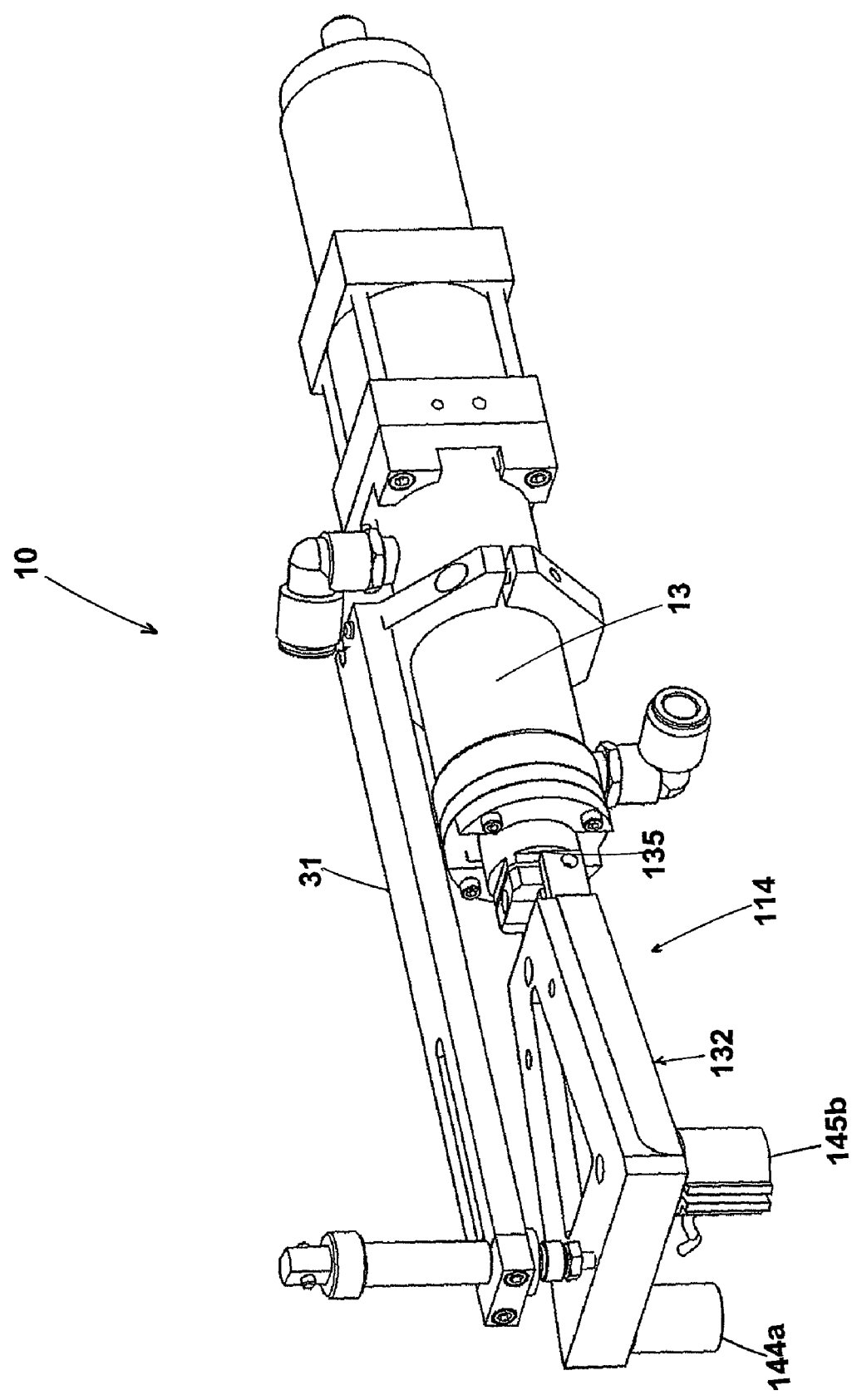
FIG. 6 is a perspective view of the apparatus with an improved nozzle assembly.
Figure 7:
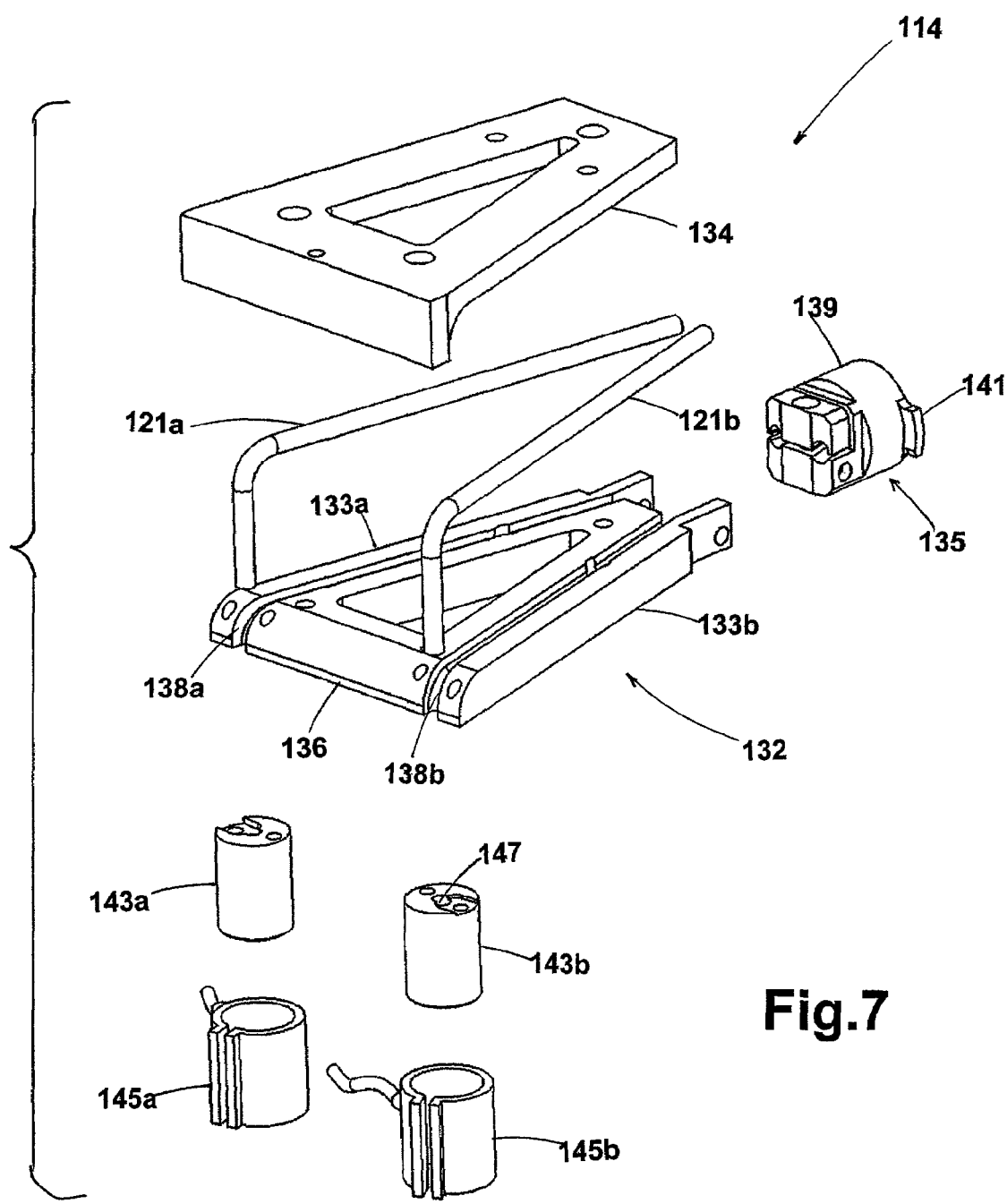
FIG. 7 is an expanded view of the nozzle assembly.
Figure 8:
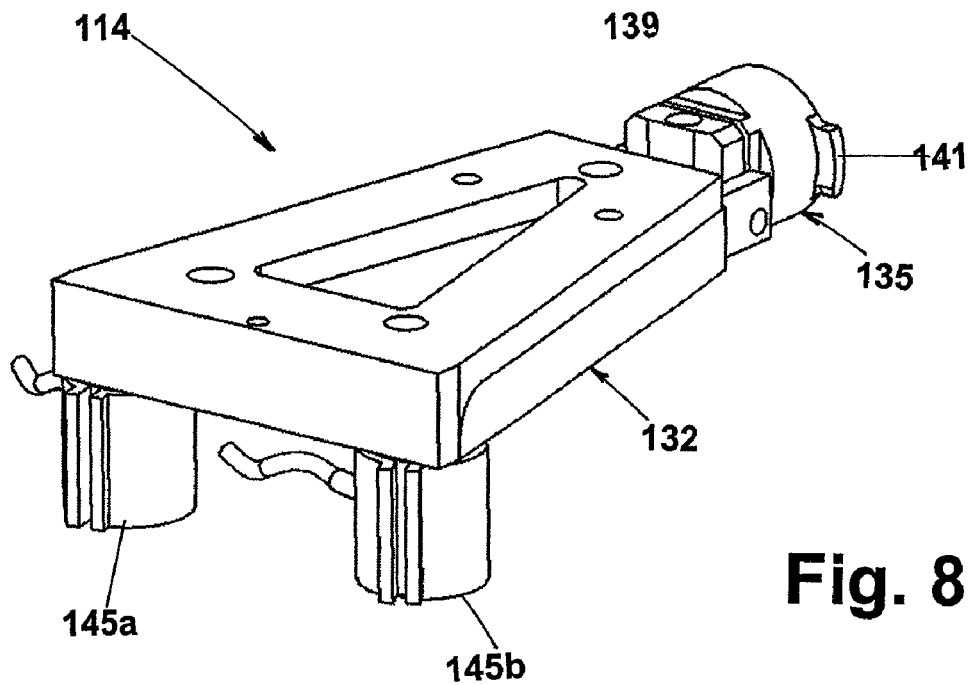
FIG. 8 is a perspective view of the completed nozzle assembly.
Figure 9:
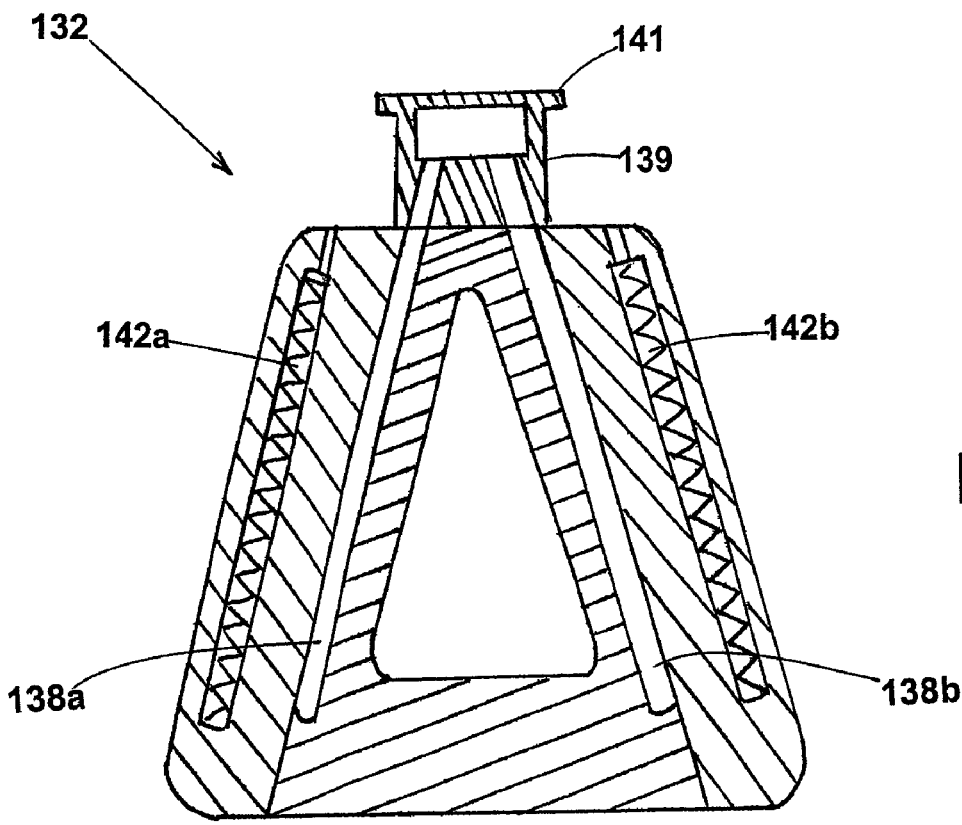
FIG. 9 is a cross-sectional top plan view of the nozzle assembly showing the placement of cartridge heaters.

FIGS. 6-14 depict an embodiment wherein the dispensing tube housing 35, the nozzle assembly 14, and primarily the fixture 32 of the nozzle assembly 14 are substituted with a dispensing housing 135 that couples a nozzle framework 114 to the temperature control chamber 13. The nozzle framework includes a heated support housing 132 that houses at least one dispensing port and may house multiple dispensing ports, while only a pair 121a, 121b are shown herein, and a capillary orifice 148 affixed to a distal end of each dispensing port 121a, 121b. The tubing forming the dispensing ports 121a and 121b are substantially disposed within channels 138a and 138b defined in the metal body 136 of the heated support housing 132 (FIGS. 7 and 9). The dispensing housing 135 that connects the nozzle framework 114 to the temperature control chamber 13 includes a pair of ears 141 at the entrance to the manifold 139. These ears 141 are similar to ears 41 described above, which are inserted into the slotted recess 38 of mounting member 37 by a simple quick disconnect motion by the operator which requires only a manual rotation of the ears 41 within the slotted recess 38. The quick disconnect is essential towards achieving maximum production time efficiency.

As best shown in FIG. 7, the support housing 132 comprises a body 136, a pair of side sections 133a and 133b, a pair of channels 138a and 138b which are defined by the body 136 and the side sections 133a, 133b, and wherein the dispensing ports 121a and 121b are disposed. The support housing 132 has a top portion 134 that is connected to the base 136. The top portion has means for connecting to the extended arm potion 31 (FIG. 6). The support housing 132 may have an optional pair of support housing heaters 142a and 142b disposed therein which are typically about 250 W, 240V and about 0.25 inch in diameter (as best seen in FIG. 9). Although there is heating of the material in the temperature control chamber 13, there is a significant advantage achieved by heating the dispensing ports 121a and 121b directly. The main reason for this is that the material resides in the temperature control chamber 13 for about 18 to 22 seconds, but it only resides in the heated support housing 132 for about 1 second. Therefore the bulk of the material is left unaffected and only that material actually being dispensed need be heated.

Prolonging the dispensing time for castable ball molding processes, especially materials such as light stable polyurea, is a production necessity. These dispensing times are inherently shortened by the onset of what is termed "drooling" after a certain amount of production time. Light stable ureas are especially prone to drooling. Drooling is a term used to describe a reaction which causes an inevitable build-up of material on the lid of the dispensing tube. As the material continues to build-up, it causes the diameter to inherently reduce in size. When the material is dispensed, it thus is forced through a smaller opening, and as it exits the dispensing ports 121a and 121b, there is a rapid decrease in pressure that results in an expansion of the material at the orifice. This is commonly referred to as die swell, which is defined as a percentage of the extrudate diameter. The casting material eventually adheres to the outer wall of the dispensing ports 121a and 121b resulting in a drool initiation site. When the pressure is removed at the decompression stage of the process, some of the material is sucked back into the dispensing ports, however, the drool initiation site remains. Over time, more of the material accumulates in this area resulting in a long, thick agglomeration. During the molding process the drool can be deposited on the parting line of the mold causing excessive clean-up issues, as well as potentially interfering with the mold closing. Another feature that the capillary provides is a clean cutoff of material when applied to a golf ball mold.

When polyethylene was used as the dispensing tubing material, it generally took a period of about 5 minutes before the mixed castable material started to drool out of the tubing ports. It is a key inventive concept that if heat of sufficient temperature is applied, then this 5 minute period can be extended by a significant amount of time. However, because of the high temperatures necessary to heat the material, the use of polyethylene as a material for the tubing was eliminated. The necessary physical characteristics needed for tubing include: a reduced coefficient of friction; an increase in thermal conductivity; and the ability to conduct heat to the material. It was determined that the dispensing time could be extended from 5 to 12 minutes by just changing the tubing material from polyethylene to fluorinated thermoplastics. By heating the fluorinated thermoplastic dispensing ports 121a and 121b within the heated support housing 132 to an elevated temperature range of 150° F. to about 350° F., a significant improvement was obtained towards prolonging the dispensing time before the onset of drooling. This use of fluorinated thermoplastic material in conjunction with the application of heat prolonged the dispensing time to about 1-2 hours. The choice of material is crucial in improving dispensing properties, and although fluorinated thermoplastics are preferred, such materials as seamless aluminum, copper, titanium, nickel, brass and silica-coated stainless steel are all improvements over the prior art.

The dispensing time is further prolonged by the use of heater adaptors 143a and 143b as part of the support housing 132 to further control the viscosity. Each adaptor 143a, 143b, consist of two hemispherical portions 144a and 144b which form a split sleeve which is mated over the outside diameter of one of the dispensing ports 121a and 121b as best shown in FIGS. 7 and 12. The adaptors 143a and 143b are held in place by heater bands 145a and 145b and each adaptor is retained by a pair of screws 146 to facilitate the ease of handling. The outside diameter of each adaptor 143a, 143b is machined to the inside diameter of each heater band 145a, 145b. Each inside diameter of an adaptor is of a size to accommodate the outside diameter of one of the dispensing ports 121a, 121b. The outside diameter at one end of each adaptor 143a or 143b is slightly larger than the inside diameter of the heater band 145. This diameter extends partially down the adaptor 143a, 143b to provide a ridge 151 that prevents an assembled adaptor 143a, 143b, from sliding completely through a heater band 145a, 145b. The outside diameter of the two hemispherical portions 144a and 144b, form a substantially circular cross section when mated over the outside diameter of one of the dispensing ports 121a, 121b, subsequently defining a circular split 147 which is typically symmetrical about the center line of the adaptor 143a or 143b. This allows for positive compression on the outside diameter of the dispensing port 121a, 121b, which is provided by the clamping action by one of the heater bands 144a, 144b. The adaptors 143a, 143b as described herein are best used for either metal dispensing ports.

When the capillary orifice 148 accommodates the dispensing tube 121a being made out of metal, one end (threaded portion 149) of the dispensing tube is machined to accept a tapped thread in the dispensing tube 121a. For the present application the opening at the distal end of the dispensing tube 121a is machined to accept a 10-32 UNF thread, which would therein match the outside diameter of the capillary orifice 148. The machined hole falls short of penetrating completely through the outer size to control the capillary length, L. The metal dispensing tube is threaded with a 10-32 UNF. The capillary orifice 148 is threaded on to the metal dispensing tube until it stops to complete the assembly. When the nozzles become fouled, they can easily be unscrewed and replaced with a new nozzle.

FIGS. 11-12 show a capillary orifice 148 typically consisting of a metal body having a threaded portion 149 on one end to attach to the distal end of dispensing ports 121a, 121b, and a machined capillary portion 150 at the other end which is designed to penetrate into the pressure drop area. The diameter of the capillary portion 150 can be sized as desired but is typically smaller than the dispensing port 121a, or 121b. However, it must be sized to provide free flowing of material and the stated benefits without creating excessive back pressure that can cause mixer seal failure. The capillary orifice 148 helps minimize material build-up, resulting drool, and improves cut-off of the material after it has been deposited in the mold casing.

While the dispensing ports 121a, 121b, may be made from metal as described above, the dispensing ports 121a, 121b are preferably made of a fluorinated thermoplastic having a continuous use temperature of about 450° F. to 500° F. At these temperatures fluorinated thermoplastic may soften slightly but will not melt. By adding heat to the tip of the dispensing ports 121a, 121b, urea and urethane drooling is significantly reduced or eliminated for greater than 2 hours of production time. Typically the dispensing ports 121a, 121b, are small in diameter; typically about 0.187 inch.

Figure 13:
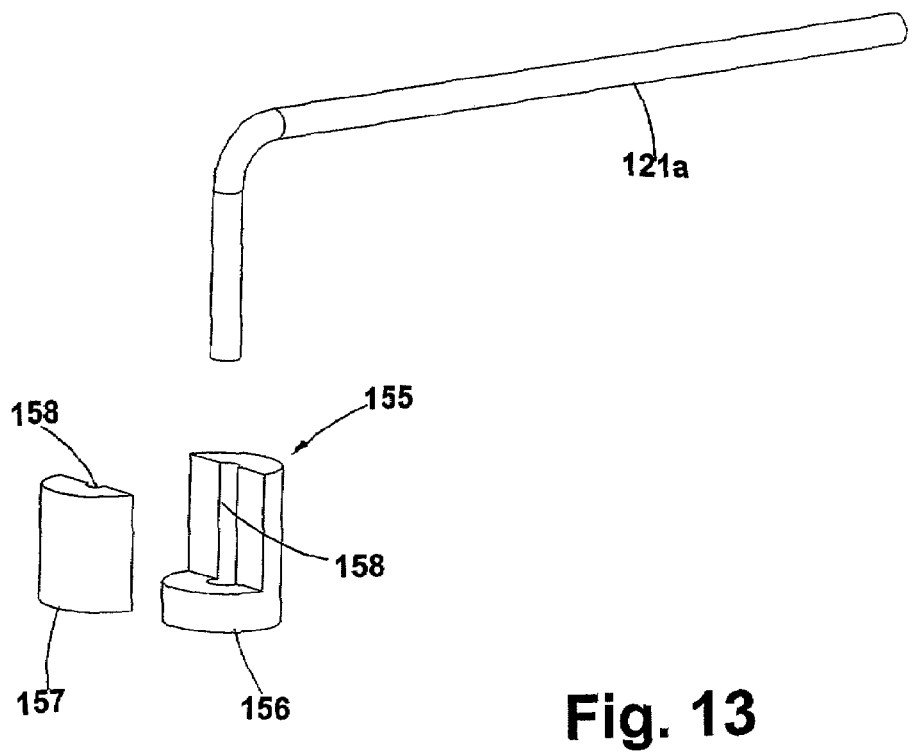
FIG. 13 is an expanded view of a fluorinated thermoplastic dispensing tube and a split adaptor.
Figure 14:
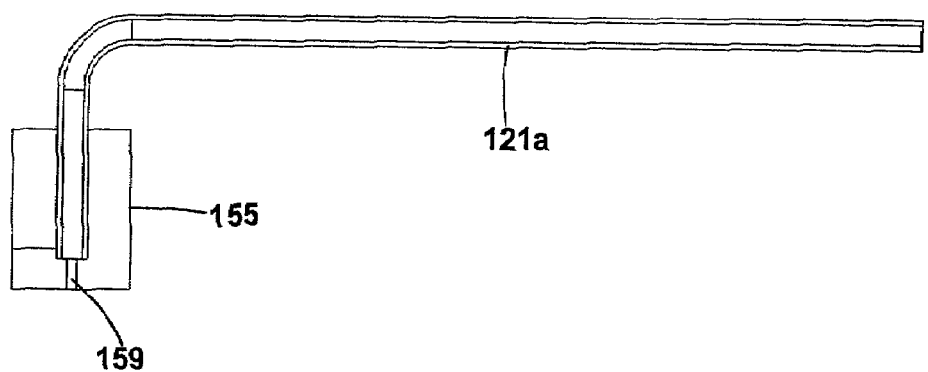
FIG. 14 is a cross-sectional view of FIG. 13 showing a capillary orifice.

FIGS. 13 and 14 describe an embodiment that utilizes a split adaptor 155 that comprises a base portion 156 and a clamping portion 157. The capillary section 159 is defined into a bottom section of the base portion 156. Semi-circular recesses 158 are defined each portion 156 and 157, and when the two portions are combined, they form a groove 158 for housing the distal end of a fluorinated thermoplastic dispensing port 121a. It is to be appreciated that the groove 158 and dispensing ports 121a and 121b may take other shapes than the circular shown herein, and still be effective.

The use of a capillary orifice helps to reduce the area wherein cured material stagnates to produce a drool initiation site. It also increases the pressure at the orifice to help push out any cured material and makes the decompression more effective by limiting the amount of material to be "sucked back" into the pressure reduction area. In addition to reducing die swell due to a small diameter of extrudate, capillary orifices also increase the shear rate at the dispensing port orifice, which reduces the viscosity of polyurethane and polyurea. In addition, the use of capillary orifices provide better control of the viscosity and improve cut-off.

The combination of using support housing heaters 142a and 142b, heater adaptors 143a, 143b, capillary orifices 148, and fluorinated thermoplastic material for forming the dispensing ports 121a and 121b, can prolong the dispensing time before the onset of drool of the dispensing ports 121a, 121b from about 5 minutes to about 5 hours.

While it is apparent that the illustrative embodiments of the invention herein disclosed fulfill the objective stated above, it will be appreciated that numerous modifications and other embodiments may be devised by those skilled in the art. Therefore, it will be understood that the appended claims are intended to cover all such modifications and embodiments which come within the spirit and scope of the present invention.

We claim:

1. A process for producing a homogenous material from a mixture of reactive components, comprising the steps of:
   providing at least two castable reactive components;
   pumping the components into and through a mixer body;
   mixing the components in the mixer body by means of a dynamic mixer element;
   cooling the mixer body to remove exothermic heat generated by mixing of the components;
   heating the components to a temperature in the range of about 150° F. to about 350° F. as the components flow through at least one dispensing port; and
   dispensing the components through the at least one dispensing port into a golf ball mold cavity, the port moving into and out of the mold cavity by pneumatic pressure so the components are deposited into the cavity, for forming about a golf ball sub-assembly.

2. The process according to claim 1, wherein the reactive components comprise polyureas and blends thereof.

3. The process according to claim 1, wherein the reactive components comprise urethanes and blends thereof.

4. The process of claim 1, wherein the components are heated using at least one heater disposed in a support housing, the heater being in close proximity to the at least one dispensing port.

5. The process of claim 1, wherein the components are heated using at least one heater adaptor, the adaptor being mated over the at least one dispensing port.

6. The process of claim 1, wherein the components are dispensed through at least one capillary orifice attached to the at least one dispensing port.

7. The process of claim 1, wherein the at least one dispensing port is made of a fluorinated thermoplastic material.

8. The process of claim 1, wherein the components are dispensed through two dispensing ports.

9. The process of claim 1, wherein the components are dispensed through two capillary orifices, each orifice being attached to a dispensing port.

10. The process of claim 1, wherein the mixing body is surrounded by a temperature control chamber and the mixing body is cooled by introducing cooling water into the chamber.

* * * * *